United States Patent [19]
Paschen et al.

[11] Patent Number: 5,920,130
[45] Date of Patent: Jul. 6, 1999

[54] OVERHEAD LINE FOR ELECTRICAL ENERGY TRANSMISSION

[75] Inventors: Rolf Paschen, Bad Schoenborn; Gerd Fitterer, Mannheim; Helmut Boehme, Nussloch; Norbert Graeber, Schriesheim, all of Germany

[73] Assignee: ABB Research Ltd, Zuerich, Switzerland

[21] Appl. No.: 08/960,765

[22] Filed: Oct. 30, 1997

[30] Foreign Application Priority Data

Oct. 30, 1996 [DE] Germany .................. 196 45 002

[51] Int. Cl.$^6$ ............................................. H04B 3/30
[52] U.S. Cl. ........................ 307/91; 174/32; 333/12
[58] Field of Search ........................ 307/89, 90, 91, 307/104, 326–328, 147; 333/12; 174/32, 34, 33, 36, 40 R, 43, 35 R, 35 MS; 361/107, 143, 146, 139; 315/85

[56] References Cited

U.S. PATENT DOCUMENTS

| | | | |
|---|---|---|---|
| 3,801,877 | 4/1974 | Griese et al. | 361/139 |
| 5,360,998 | 11/1994 | Walling | 307/91 |
| 5,465,012 | 11/1995 | Dunnam | 307/91 |
| 5,616,969 | 4/1997 | Morava | 307/91 |
| 5,656,872 | 8/1997 | Lee | 307/91 |
| 5,777,401 | 7/1998 | Sjodin | 307/91 |

*Primary Examiner*—Richard T. Elms
*Attorney, Agent, or Firm*—Herbert L. Lerner; Laurence A. Greenberg

[57] ABSTRACT

An overhead line for electrical energy transmission, includes three phase conductors of a three-phase system. The three phase conductors are disposed vertically one above the other and define an upper phase conductor and a lower phase conductor. At least one additional compensation loop having a first conductor, a second conductor, and vertical connecting conductors surround the three phase conductors. The first conductor of the at least one additional compensation loop is disposed parallel to and above the upper phase conductor. The second conductor of the at least one additional compensation loop is disposed parallel to and below the lower phase conductor. The first and the second phase conductors are connected to one another via vertical connecting conductors. A compensation current is fed into the at least one compensation loop. The compensation current has a phase and an amplitude set with respect to a phase and an amplitude of a phase current flowing in the three phase conductors such that a magnetic flux produced by the compensation current counteracts a magnetic flux produced by the phase current flowing in the three phase conductors. There is also a control device and a current source for producing and controlling the amplitude and the phase of the compensation current. The control device drives the current source. A magnetic field measuring device is connected to the control device for detecting the magnetic field under the overhead line.

7 Claims, 2 Drawing Sheets

OVERHEAD LINE FOR ELECTRICAL ENERGY TRANSMISSION

BACKGROUND OF THE INVENTION

Field of the Invention

The invention relates to electrical energy transmission via an overhead line having three phase conductors of a three-phase system which are arranged vertically one above the other or horizontally alongside one another.

Depending on the current transmitted, a magnetic field is unavoidably produced in the vicinity of the overhead lines. The magnetic field is characterized, inter alia, by the root mean square (rms) value of its magnetic induction.

In order to avoid hazardous interactions between the magnetic field and human health, it should be as low as possible at points which are intended for occupancy by people, and must in no case exceed recommended limits or legally defined limits.

SUMMARY OF THE INVENTION

It is accordingly an object of the invention to provide an overhead line for electrical energy transmission, which overcomes the herein-mentioned disadvantages of the heretofore-known devices and methods of this general type, and which produces a significantly reduced magnetic field in the region underneath the conductors and in the vicinity of the earth's surface, preferably up to a height of 2 to 3 m above the surface.

With the foregoing and other objects in view there is provided, in accordance with the invention, an overhead line for electrical energy transmission, comprising: a phase conductor which carrys a phase current with a given phase and a given amplitude and has a given magnetic flux; a compensation loop has a first conductor parallel to and above the phase conductor, a second conductor parallel to and below the phase conductor, and vertical connecting conductors which connect the first conductor and the second conductor and surrounds the phase conductor; the compensation loop carrys a compensation current with a phase and an amplitude set with respect to the given phase and the given amplitude of the phase current flowing in the phase conductor such that a magnetic flux produced by the compensation current counteracts the given magnetic flux produced by the phase current flowing in the phase conductor; a current source for producing and controlling the amplitude and the phase of the compensation current, and a control device driving the current source; and a magnetic field measuring device connected to the control device for detecting a magnetic field below the phase conductor and transmitting magnetic field data to the control device.

In accordance with an added feature of the invention, the phase conductor is three phase conductors of a three-phase system, the three phase conductors are disposed vertically one above the other defining an upper phase conductor and a lower phase conductor; and the first conductor of the compensation loop is parallel to and above the upper phase conductor, and the second conductor of the compensation loop is parallel to and below the lower phase conductor.

The object is achieved in the case of an overhead line for electrical energy transmission which has three phase conductors of a three-phase system arranged vertically one above the other in that the phase conductors are surrounded by at least one additional compensation loop. A first conductor of the compensation loop is arranged parallel above an upper phase conductor, and a second conductor of the compensation loop is arranged parallel below a lower phase conductor. The first and second conductors are connected to one another via side, vertical connecting conductors, and in that a compensation current is fed into the at least one additional compensation loop. A phase and an amplitude of the compensation current are set with respect to a phase and an amplitude of a phase current flowing in the phase conductor such that a magnetic flux produced by it counteracts a magnetic flux produced by the phase current. The compensation current is produced by a current source whose magnitude and phase are controllable and which can be driven by a control device which is connected to a magnetic field measuring device for detecting the magnetic field under the overhead line.

In accordance with another feature of the invention, there is a series capacitor connected in the at least one compensation loop.

With the foregoing and other objects in view there also is provided, in accordance with the invention, an overhead line for electrical energy transmission, comprising: three phase conductors of a three-phase system, the three phase conductors are disposed horizontally alongside one another and define a first outer phase conductor and a second outer phase conductor; at least one compensation loop which has a first conductor and a second conductor surrounds the three phase conductors, the first conductor of the at least one compensation loop is disposed parallel to and alongside the first outer phase conductor, and the second conductor of the at least one compensation loop is disposed parallel to and alongside the second outer phase conductor; side connecting conductors connect the first conductor and the second conductor; the compensation loop carrys a compensation current which has a phase and an amplitude set with respect to a phase and an amplitude of a phase current flowing in the three phase conductors such that a magnetic flux produced by the compensation current counteracts a magnetic flux produced by the phase current flowing in the three phase conductors; a current source for producing and controlling the amplitude and the phase of the compensation current, and a control device driving the current source; and a magnetic field measuring device connected to the control device for detecting a magnetic field below the three phase conductors and transmitting magnetic field data to the control device.

The object is achieved in the case of an overhead line for electrical energy transmission with three phase conductors of a three-phase system arranged horizontally alongside one another in that the phase conductors are surrounded by at least one additional compensation loop. A first conductor of the compensation loop is arranged parallel alongside a first outer phase conductor, and a second conductor of the compensation loop is arranged parallel alongside a second outer phase conductor. The first and second conductors are connected to one another via side connecting conductors. A compensation current is fed into the at least one additional compensation loop. A phase and an amplitude of the compensation current are set with respect to a phase and an amplitude of the phase current flowing in the phase conductor such that a magnetic flux produced by it counteracts a magnetic flux produced by the phase current. The compensation current is produced by a current source whose magnitude and phase are controllable and which can be driven by a control device which is connected to a magnetic field measuring device for detecting the magnetic field under the overhead line.

In accordance with a concomitant feature of the invention, there is also a series capacitor connected in the at least one compensation loop.

The advantages which can be achieved by the invention are, in particular, that both the maximum rms value of the magnetic induction $B_{rmsmax}$ in a region up to a height of 2 to 3 m above the earth's surface and the distance $x_{0.2\,\mu T}$ from an overhead line axis at which the rms value of the magnetic induction reaches the value 0.2 $\mu$T at a height of 2 m above the earth's surface and is less at greater distances are reduced to a major extent. The magnetic fields in the region 2 to 3 m above the earth's surface can be reduced to less than 10% in comparison with those from an uncompensated, conventional overhead line. This is because the magnetic coupling between the compensation loop (in particular the phase and amplitude of the compensation current) and the overhead line is mutually matched. That is to say the compensation loop and the overhead line are regarded as a geometric and electrical unit. A compensation current is fed into the at least one compensation loop. The phase and amplitude of the compensation current are set with respect to the phase and amplitude of the phase current flowing in the phase conductor such that the magnetic flux produced by it counteracts the magnetic flux produced by the phase current, and thus reduces the magnetic induction.

Other features which are considered as characteristic for the invention are set forth in the appended claims.

Although the invention is illustrated and described herein as embodied in an overhead line for electrical energy transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
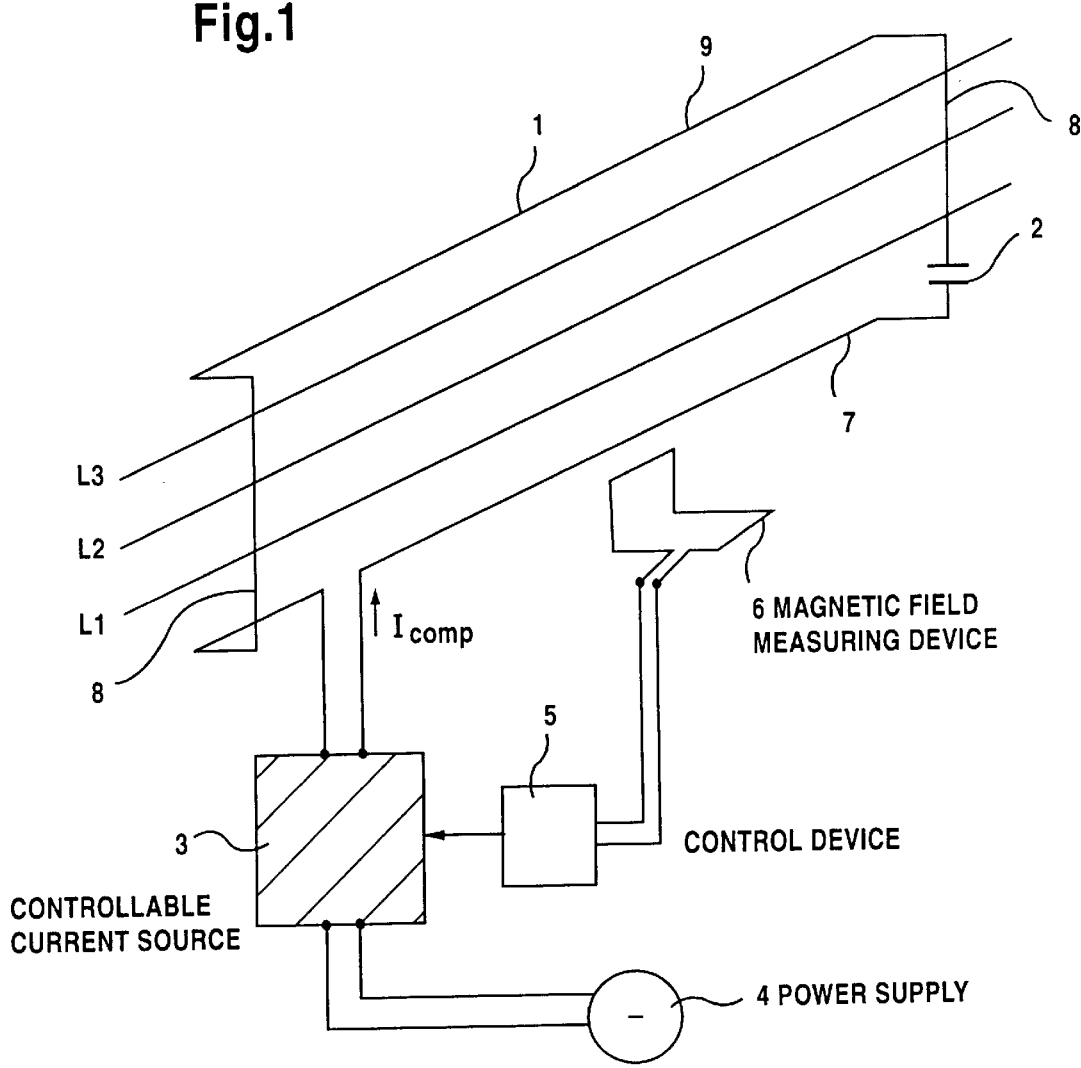
FIG. 1 is a diagrammatic view of a basic arrangement of an overhead line having a reduced magnetic field according to the invention.

Referring now to the figures of the drawings in detail and first, particularly, to FIG. 1 thereof, there is shown a basic arrangement of an overhead line with a reduced magnetic field. Three phase conductors L1, L2, L3 of a three-phase system disposed one above the other (with three currents each phase-shifted through 120°, the phase angles being $\phi(iR)=0°$, $\phi(iS)=-120°$ and $\phi(iT)=-240°$) can be seen. The three phase conductors L1, L2, L3 are surrounded by a compensation loop 1. An upper conductor 9 (also called a first conductor 9) of the compensation loop 1 runs above an upper phase conductor L3, and a lower conductor 7 (also called a second conductor) of the compensation loop 1 runs below a lower phase conductor L1.

The upper conductor 9 and the lower conductor 7, or the first conductor 9 and the second conductor 7, of the compensation loop 1 are connected to one another via side, vertical connecting conductors 8.

In order to reduce a magnetic field occurring in a region of the earth's surface underneath the overhead line, a compensation current $I_{comp}$ is fed into the compensation loop 1.

The compensation current $I_{comp}$ is produced by a controllable current source 3, which is connected to a power supply 4, for example to a low-voltage power supply. A control device 5 is used to precisely set an amplitude and a phase of the compensation current $I_{comp}$. The control device 5 receives actual values from a magnetic field measuring device 6, which permanently detects, horizontally and vertically, a magnetic field underneath the overhead line.

The amplitude and the phase of the compensation current $I_{comp}$ are continuously set by the controllable current source 3 and the control device 5 as a function of a power load in the overhead line, which varies with time, such that the magnetic field detected by the magnetic field measuring device 6 in the vertical and horizontal directions is a minimum.

The magnetic field produced by the compensation current $I_{comp}$ is superimposed in a compensating manner on the magnetic field produced by the phase conductors L1, L2, L3 such that the magnetic field between the earth's surface and a height of 2 to 3 m is significantly reduced. A required phase of the compensation current $I_{comp}$ depends on which of possible phase sequences is actually used. For example, in the case of the three-phase system with conductors disposed one above the other, six different phase sequences can be used, namely L1=R, L2=S, L3=T (called R S T for short), L1=R, L2=T, L3=S (called R T S for short), L1=T, L2=R, L3=S (called T R S for short), L1=T, L2=S, L3=R (called T S R for short), L1=S, L2=T, L3=R (called S T R for short), or L1=S, L2=R, L3=T (called S R T for short).

Figure 2:
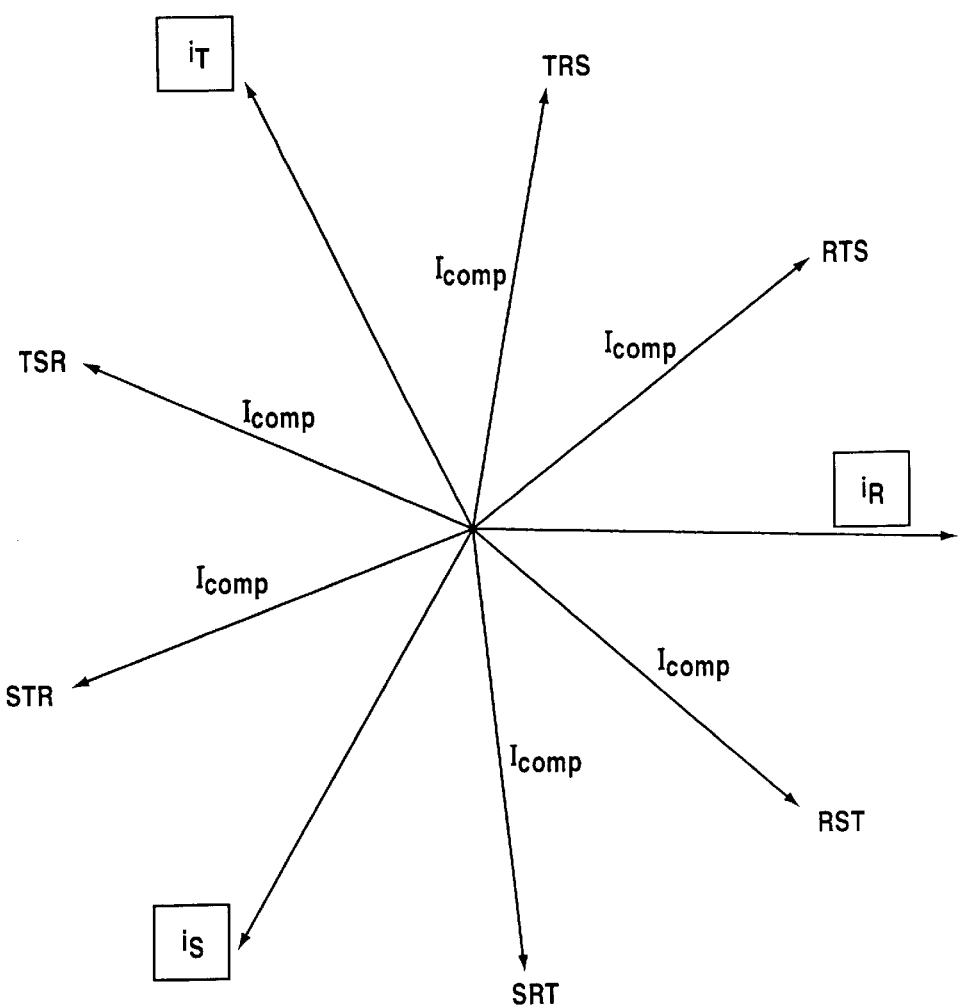
FIG. 2 is a diagrammatic view of basic phases of compensation currents in a lower conductor of a compensation loop for a possible conductor current phase sequences.

To illustrate the phases, FIG. 2 shows basic required positions of vector s of the compensation currents $I_{comp}$ for maximum reduction of the magnetic field for phase conductors L1, L2, L3 disposed one above the other, and the possible phase sequences denoted above. The positions of vectors of the phase currents $I_R$, $I_S$, $I_T$ are marked.

As can be seen, the phases of the compensation currents $I_{comp}$ required for optimum magnetic field reduction are approximately in antiphase to a respective bottom phase. That is to say the phase closest to the earth's surface. Those required phases of the compensation currents $I_{comp}$ as well as the required amplitudes are set taking into account resistances and reactances of the current path and the actual arrangement (geometry) of the phase conductors L1, L2, L3 and of the compensation loop 1, as well as the amplitudes of the phase currents $I_R$, $I_S$, $I_T$, by the controllable current source 3 and control device 5.

If the phase and amplitude of the compensation current $I_{comp}$ fed into the compensation loop 1 are correct, the result is a significant reduction in the rms value of the induction, such that, as desired, $B_{rmsmax}$ and $x_{0.2\,\mu T}$ are greatly reduced. For example, the current level of the compensation current is approximately 40% of the phase current.

It is, of course, also possible to split the overhead line into three, four or more sections with a plurality of compensation loops 1. The important factor in the case is to know the sections of the overhead line in which extreme reduction of the magnetic field is required, and the sections in which this is not necessary.

The series capacitor 2 disposed in the compensation loop 1 compensates for an inductive voltage drop in the compensation loop 1 and produces both a desirable phase shift of the compensation current $I_{comp}$ to the required phase, and a matched loop impedance. However, the series capacitor 2 is not absolutely central.

Figure 3:
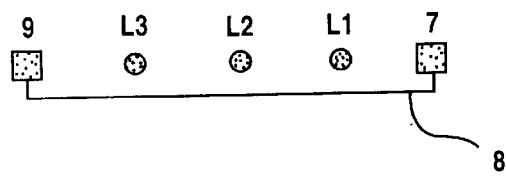
FIG. 3 is a diagrammatic view of the compensation loop for the phase conductors disposed alongside one another.

The above considerations relate, for example, to the exemplary embodiment having three phase conductors L1, L2, L3 disposed vertically one above the other since the greatest magnetic field reduction is achieved with the phase conductor configuration. However, the idea of the invention can also be implemented with phase conductors L1, L2, L3 disposed horizontally alongside one another. The corresponding configuration is sketched in FIG. 3. The position of the conductors 7,9 in the compensation loop 1 is indicated. However, as already indicated, the effect of the measures proposed according to the invention is not so great with phase conductors L1, L2, L3 disposed horizontally alongside one another as with phase conductors L1, L2, L3 disposed vertically one above the other. This is because of the fact that, in the case of phase conductors L1, L2, L3 disposed vertically one above the other, the magnetic field underneath the overhead line is polarized linearly, which assists in the compensation.

Figure 4:
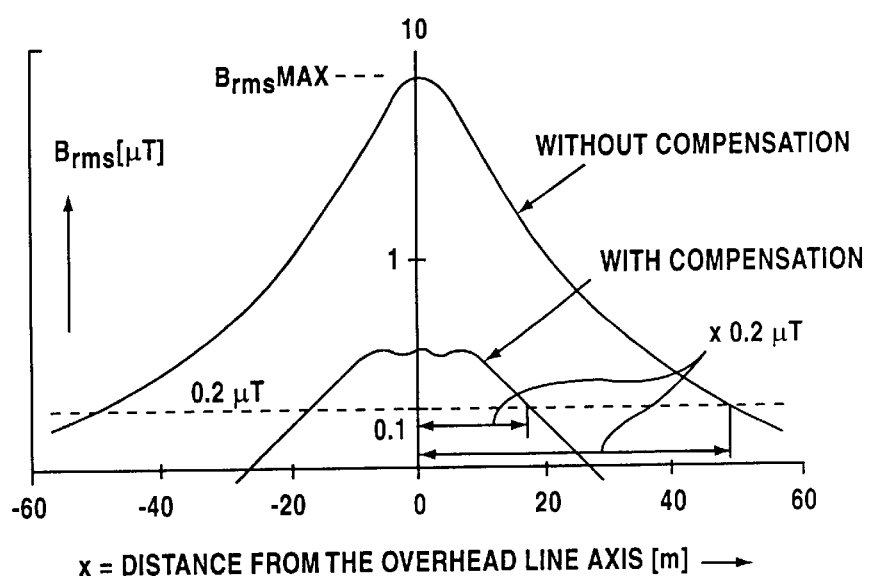
FIG. 4 is a graphic view showing how magnetic induction underneath the overhead line varies with a distance from a line axis.

By way of example, FIG. 4 shows how the magnetic induction underneath an overhead line varies with the distance from a line axis, to be precise, by way of example, for a height of 2 m above the earth's surface (magnetic field profile with and without compensation). The line axis of the overhead line, which is vertical with respect to the earth's surface, runs through the point x=0 m. Without compensation, the rms value of the induction $B_{rms}$ reaches its maximum $B_{rmsmax}$ of about 10 $\mu$T when x=0 m, and is reduced on both sides from x=0 m. At the distances x=+47 m and x=−47 m from the line axis, Brms reaches the value 0.2 $\mu$T characterizing the magnetic field, that is to say the value x0.2 $\mu$T is 47 m. With compensation, the value x0.2 $\mu$T is advantageously reduced to about 17 m.

We claim:

1. An overhead line for electrical energy transmission, comprising:

a phase conductor carrying a phase current with a given phase and a given amplitude and having a given magnetic flux;

a compensation loop having a first conductor parallel to and above said phase conductor, a second conductor parallel to and below said phase conductor, and vertical connecting conductors connecting said first conductor and said second conductor and surrounding said phase conductor;

said compensation loop carrying a compensation current with a phase and an amplitude set with respect to the given phase and the given amplitude of the phase current flowing in said phase conductor such that a magnetic flux produced by the compensation current counteracts the given magnetic flux produced by the phase current flowing in said phase conductor;

a current source for producing and controlling the amplitude and the phase of the compensation current, and a control device driving said current source; and a magnetic field measuring device connected to said control device for detecting a magnetic field below said phase conductor and transmitting magnetic field data to said control device.

2. The overhead line according to claim 1, including a series capacitor connected in said compensation loop.

3. The overhead line according to claim 1, wherein said phase conductor is three phase conductors of a three-phase system, said three phase conductors being disposed vertically one above the other defining an upper phase conductor and a lower phase conductor; and said first conductor of said compensation loop is parallel to and above said upper phase conductor, and said second conductor of said compensation loop is parallel to and below said lower phase conductor.

4. The overhead line according to claim 1, wherein said first conductor, said second conductor and said phase conductor are disposed within a common plane.

5. An overhead line for electrical energy transmission, comprising:

three phase conductors of a three-phase system, said three phase conductors disposed horizontally alongside one another defining a first outer phase conductor and a second outer phase conductor;

at least one compensation loop having a first conductor and a second conductor surrounding said three phase conductors, said first conductor of said at least one compensation loop disposed parallel to and alongside said first outer phase conductor, and said second conductor of said at least one compensation loop disposed parallel to and alongside said second outer phase conductor;

side connecting conductors connecting said first conductor and said second conductor;

said compensation loop carrying a compensation current having a phase and an amplitude set with respect to a phase and an amplitude of a phase current flowing in said three phase conductors such that a magnetic flux produced by the compensation current counteracts a magnetic flux produced by the phase current flowing in said three phase conductors;

a current source for producing and controlling the amplitude and the phase of the compensation current, and a control device driving said current source; and a magnetic field measuring device connected to said control device for detecting a magnetic field below said three phase conductors and transmitting magnetic field data to said control device.

6. The overhead line according to claim 5, including a series capacitor connected in said at least one compensation loop.

7. The overhead line according to claim 6, wherein said first conductor, said second conductor and said phase conductors are disposed within a common plane.

* * * * *